FLASHLAMP CIRCUIT WITH A HIGH TRIGGERING CONDENSER
AND A LOAD CONDENSER IN PARALLEL
Filed Feb. 3, 1967
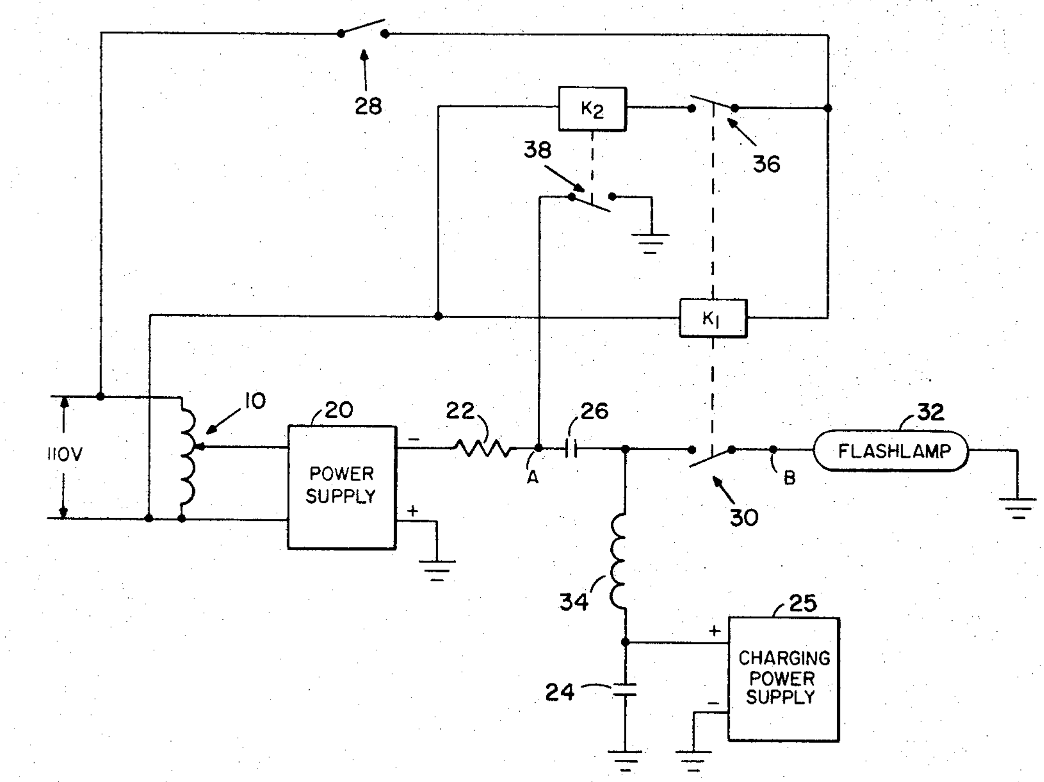
William B. McKnight
William F. Otto
James R. Dearman, DECEASED,
BY Dorothy H. Dearman, ADMINISTRATRIX
Ralph W. Hawkins,
INVENTORS.
BY Harry M. Saragovitz
Edward J. Kelly
Herbert Berl
Alfred E. Smith

1

3,414,765

FLASHLAMP CIRCUIT WITH A HIGH TRIGGERING CONDENSER AND A LOAD CONDENSER IN PARALLEL

William B. McKnight, Somerville, William F. Otto and Ralph W. Hawkins, Huntsville; and James R. Dearman, deceased, late of Huntsville, by Dorothy H. Dearman, administratrix, Huntsville, Ala., assignors to the United States of America as represented by the Secretary of the Army Filed Feb. 3, 1967, Ser. No. 615,294
7 Claims. (Cl. 315—173)

ABSTRACT OF THE DISCLOSURE

A pulse triggering circuit for supplying high electrical power pulses to energize flashlamps used in high energy laser systems. A first capacitor is charged by first and second series connected power sources, which supply very high direct current voltages. A second capacitor is charged by the second power source, simultaneously with the first capacitor. A solenoid controlled, vacuum switching circuit is activated at the required time to switch the capacitors to a load circuit. By the switching action, the capacitors are paralleled across the load and discharge therethrough. The solenoid controlled switches open the discharge path and thereby allow the capacitors to be recharged, proir to another firing.

The invention described herein may be manufactured, used, and licensed by or for the Government for governmental purposes without the payment to us of any royalty thereon.

This invention relates in general to high voltage pulse systems and more particularly to pulse systems for applying high voltage pulses to flashlamps used in high energy laser systems.

Prior art systems for pulsating high energy flashlamps use a high voltage pulse transformer to supply the pulse to the lamp. This is usually done by means of a fine wire wrapped around the lamp. This method, of course, requires that the lamp be insulated from conductive materials. In high energy laser applications it is necessary to surround the lamp with a reflective material, usually silver, which makes it difficult to use the wire method. Some applications require that the lamp be immersed in a liquid at times which makes it impossible to use the wire method. It is then necessary to use a pulse transformer connected in series with the lamp. Such a method requires a transformer having a very high current carrying capacity which results in the transformer being large, bulky, and expensive. Further, this method has the disadvantage of being unreliable because misfires and prefires frequently occur.

Accordingly, it is an object of the present invention to provide a high voltage pulse system that is highly reliable, is light in weight, and less expensive than previous systems.

The present invention accomplishes the desired results by utilizing a capacitor discharge firing circuit and means for holding the capacitor voltage away from the flashlamp until ready to fire. This is done by using a high voltage vacuum switch to transfer the energy from the capacitor circuit to the flashlamp. With this arrangement it is impossible for a prefire to occur. The energy transfer vacuum switch simultaneously applies a high voltage breakdown pulse to the flashlamp.

The invention, together with further objects and advantages thereof, will be readily understood from the following detailed description considered in conjunction with the accompanying drawing wherein the single figure is a schematic diagram of a preferred embodiment.

2

Referring to the drawing, a variable transformer 10 is shown connected to a 110 volt A.C. line for supplying a variable A.C. voltage to a 30 kv. D.C. power supply 20. Transformer 10 is made variable so that the output of power supply 20 can be adjusted to the desired voltage.

The positive output of power supply 20 is connected to ground and the negative output is connected to a current limiting resistor 22. If the output of power supply 20 is adjusted for its maximum and capacitor 24 is charged to 5000 volts from source 25, then capacitor 26 will charge to a value of approximately —35,000 volts.

When the "FIRE" switch 28 is closed, solenoid $K_1$ actuates and closes vacuum switch contacts 30 which connect capacitor 24 to laser flashlamp 32 through inductor 34. Auxiliary contacts 36 of solenoid $K_1$ apply voltage to solenoid $K_2$ which closes vacuum switch contacts 38. When contacts 38 are closed the voltage at point A must rise to ground potential which means that point B must rise an equal amount (i.e. 30,000 volts). Since point B was previously at 5,000 volts, the voltage is now approximately 35,000 volts. This is well above the breakdown voltage of flashlamp 32. The lamp, therefore, breaks down and the energy stored in capacitor 24 is transferred to the lamp. The momentary switch 28 automatically opens the circuit to solenoid $K_1$ which opens contacts 30 and 36 which in turn cause solenoid $K_2$ to drop off. opening contacts 38 and allows capacitor 26 to recharge for the next cycle.

While this invention has been described with reference to a specific embodiment thereof, it will be apparent that various modifications and changes may be made without departing from the spirit of the invention, as defined in the appended claims.

What is claimed is:

1. A high voltage pulse system comprising a first energy storage means; a load to be energized by said storage means; a first switching device connecting said first energy storage means to said load; a second energy storage means for applying a breakdown voltage pulse to said load; and a second switching device responsive to said first switching device for discharging said second energy storage means across said load and thereby permitting transfer of the energy stored in said first storage means to the load.

2. A high voltage pulse system as set forth in claim 1 wherein said first and second switching devices are solenoid operated high voltage vacuum switches.

3. A high voltage pulse system as set forth in claim 2 wherein said first switching device includes a first set of normally open contacts connected to said first energy storage means and to said load, and a second set of normally open contacts connected in series with said second solenoid and; said second swtiching device includes a second set of normally open contacts connecting said second energy storage means across said load.

4. A high voltage pulse system as set forth in claim 3 wherein said load is a laser pumping device.

5. A high voltage pulse system as set forth in claim 4 wherein said pumping device is a flashlamp.

6. A high voltage pulse system as set forth in claim 3 wherein said first storage means comprises an inductor connected to a first contact of said first set of normally open contacts, and a capacitor connected in series with said inductor; and a charging power supply connected across said capacitor.

7. A high voltage pulse system as set forth in claim 6 wherein said second storage means comprises a capacitor connected between the junction of said inductor and said first contact and a contact of said second set of contacts, and a high voltage power supply connected to the junction of said capacitor and said contact of said second set of contacts.

References Cited

UNITED STATES PATENTS

| | | | |
|---|---|---|---|
| 2,235,385 | 3/1941 | Rava | 315—241 X |
| 2,426,602 | 9/1947 | Edgerton | 315—230 |
| 2,574,655 | 11/1951 | Panofsky et al. | 315—241 X |
| 2,575,559 | 11/1951 | Parkinson | 328—67 |
| 2,972,112 | 2/1961 | Langan | 320—1 X |

JAMES W. LAWRENCE, *Primary Examiner.*

C. R. CAMPBELL, *Assistant Examiner.*